United States Patent [19]
Terrell

[11] 3,724,581
[45] Apr. 3, 1973

[54] TANDEM AXLE TRACTION EQUALIZER

[76] Inventor: Harold Terrell, 10901 Endry Street, Anaheim, Calif. 92804

[22] Filed: Oct. 1, 1970

[21] Appl. No.: 77,179

[52] U.S. Cl. ................................180/24.12, 180/74
[51] Int. Cl. ............................................B62d 61/10
[58] Field of Search ...............180/24.12, 74, 1 A

[56] References Cited

UNITED STATES PATENTS 2,784,793   3/1957   Rando ................................180/1 A

FOREIGN PATENTS OR APPLICATIONS 270,351   10/1966   Australia ..........................180/24.12

1,364,137   5/1964   France ..............................180/24.12

*Primary Examiner*—Kenneth H. Betts

[57] ABSTRACT

A mechanism mounted under a three axle type of truck and which includes one power or drive axle and a tag or dead axle tailing, the device comprising a vertically adjustable rollers which can be moved into a position so as to peripherally engage the tires on the power shaft and also the tires on the tag axle so as to transmit power to the wheels of the tag axle, the vertically adjustable rollers being vertically moveable by means of ram cylinders which are controlled from the dashboard of the vehicle.

1 Claim, 3 Drawing Figures

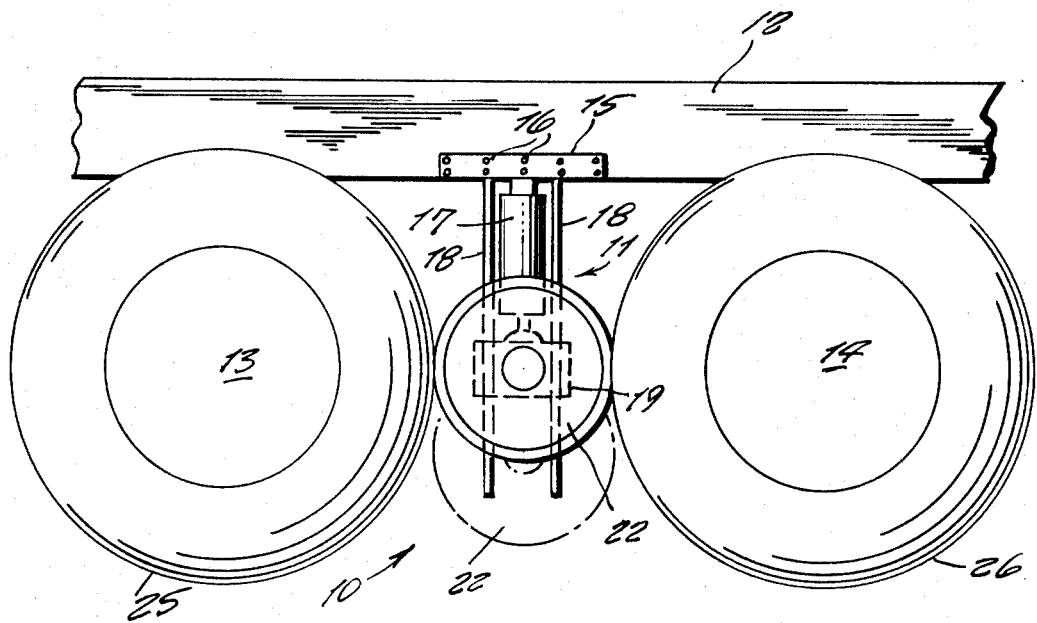
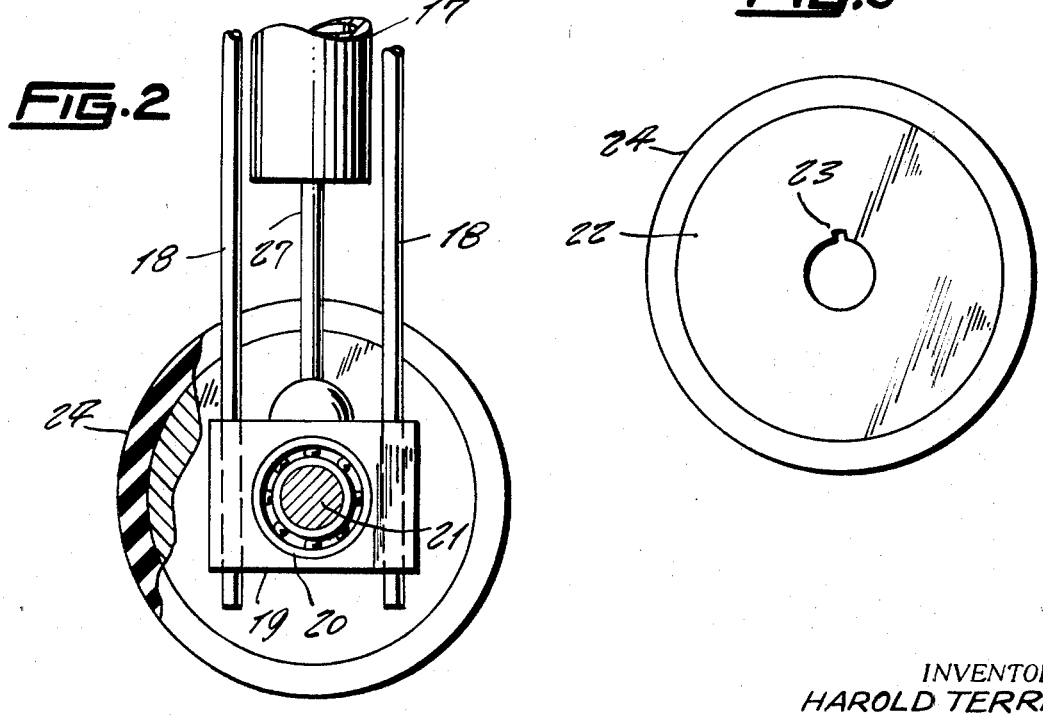

TANDEM AXLE TRACTION EQUALIZER

This invention relates generally to automotive trucks.

A principal object of the present invention is to provide a traction equalizer for a three axle truck having one power or drive axle and a tag or dead axle tailing, the equalizer placing power on all four wheels of the two rear axles for better operation.

Another object of the present invention is to provide a traction equalizer which in one form could use a single or a double reduction rear end for the first axle and a straight axle as the second or tag axle of no power.

Yet another object of the present invention is to provide a traction equalizer which will vary effectively be used on over the rood trucks running on snow, ice, slippery roads and the like.

Yet a further object of the present invention is to provide a traction equalizer having advantages over other types of transmission such as belts in view that it would be much lighter than a twin screw rear end, require very little maintenance and which could be made durable for the life of the truck.

Yet a further object of the present invention is to provide a traction equalizer which will be out of the way when not needed, and which can be easily taken off the frame in a relatively easy manner.

It is generally well known that the purpose of using a tag axle on a truck is to reduce weight for more by load, however, such tag axle cause a great deal of problems to the traction of the drive axle.

Accordingly it is another object of the present invention to provide a traction equalizer wherein when one wheel on the drive axle starts to spin on snow, ice or slipper surface, the driver can engage the traction equalizer at such time regardless of the speed of travel of the vehicle.

Still another object of the present invention is to provide a traction equalizer wherein tire chains can be used without interfering, and wherein the vehicle tires may be changed without interference from the traction equalizer.

Still a further object of the present invention is to provide a traction equalizer which may be used with a number of types of known spring suspensions.

Other objects of the present invention are to provide a traction equalizer which is simple in design, inexpensive to manufacture, rugged in construction, easy to use and efficient in operation.

These and other objects will be readily evident upon a study of the following specification and the accompanying drawings wherein there is a traction equalizer 10 comprising an assembly 11 that can be bolted under a frame 12 of an automotive truck so that it is located between a power axle 13 and a tag axle 14.

FIG. 1 is a side elevation view of the present invention shown mounted on a truck.

FIG. 2 is an enlarged fragmentary side view thereof shown partly in cross.

FIG. 3 is a side view of one of the rollers.

The assembly 11 includes plates 15 secured either by bolts 16 or by a weld to the opposite side frames 12.

An air ram or hydraulic cylinder 17 is supported by the plates 15 as shown. Additionally a pair of downwardly extending guide pins 18 are also rigidly supported from the plates 15, the lower portion of the guide pins supporting a vertically slideable bearing block 19 which carries a roller bearing or ball bearing 20 so to support frictionally free the opposite ends of a shaft 21.

Upon the terminal ends of the shaft 21 there are mounted a pair of rollers 22 each one of the rollers 22 having a key way 23 for engaging a key, not shown, on the shaft 21 so to keep the rollers from slipping respective to the shaft.

Upon each of the rollers there is mounted a peripheral rubber molding or tire 24 which may be of balloon type so that it may be inflated to take up for tire wear of the tires 25 and 26 on the power wheels of the power axle or the tag wheel on the tag axle.

The bearing block 19 is secured to an outer end of a piston shaft 27 of a piston vertically slideable within the air cylinder 17. The cylinder is controlled by the driver from the dashboard of the truck so that the rollers may be vertically moved between the positions shown in FIG. 1 by the solid line and the phantom line.

In operative use, it is now evident that when the roller is in the position, as shown by the phantom line in FIG. 1, the mechanism will be ineffective and therefore not transmit power from the power axle to the tag axle.

However, when the driver operates controls on the dashboard and causes the air cylinder to raise the rollers, the rollers will then frictionally engage the surfaces of the tires 25 and 26, thereby transmitting power to the tag axle.

It is to be noted that in a modified construction not illustrated, the lower ends of the guide pins 18 may be bridged by a casting or other part and which will serve as a limit stop for the downward travel of the bearing block 19.

What I now claim is:

1. In a traction equalizer, the combination of an assembly mountable under a three axle truck which includes a power or drive shaft and a tag or dead axle trailing, said assembly comprising a unit secured to each of the side frames of said truck, each of said units comprising a plate secured either by bolts or a weld to said side frames, said plate rigidly supporting a downwardly extending air ram or hydraulic cylinder, said plate additionally supporting a pair of downwardly extending, parallel, spaced apart guide pins, and said guide pins supporting a vertically slidable power transmission means between said power axle and said tag axle, said means comprising a bearing block having a pair of vertically extending, parallel spaced apart openings there through, said openings receiving said guide pins so that said bearing block is vertically adjustable, said bearing block supporting a ball or roller bearing, said roller bearing supporting opposite ends of a transverse shaft extending across the underside of said truck and which is supported from each of said units, said shaft at its terminal ends supporting a roller, each of said rollers having a rubber molding mounted on a periphery thereof, said molding being adaptable for frictionally engaging the tires at a same time on both of the wheels of the power axle and the tag axle of said truck, said rollers being of pneumatic type so that they maybe inflated, one end of a piston rod being affixed to an upper end of said bearing block, said piston rod communicating with a piston contained within said cylinder, said cylinder being controlled from the dashboard of said truck, and said roller being vertically movable by said piston rod between an upper position wherein said roller engages said tires and a lower position there beneath wherein said roller clears the engagement with said tires so that said roller shaft clears the frame and suspension of said truck so to not interfere therewith.

* * * * *